Dec. 10, 1968   A. L. GIRARDI   3,415,924
METHOD OF MANUFACTURING EXTENSIBLE CONVEYOR BELTS
Original Filed Aug. 24, 1960
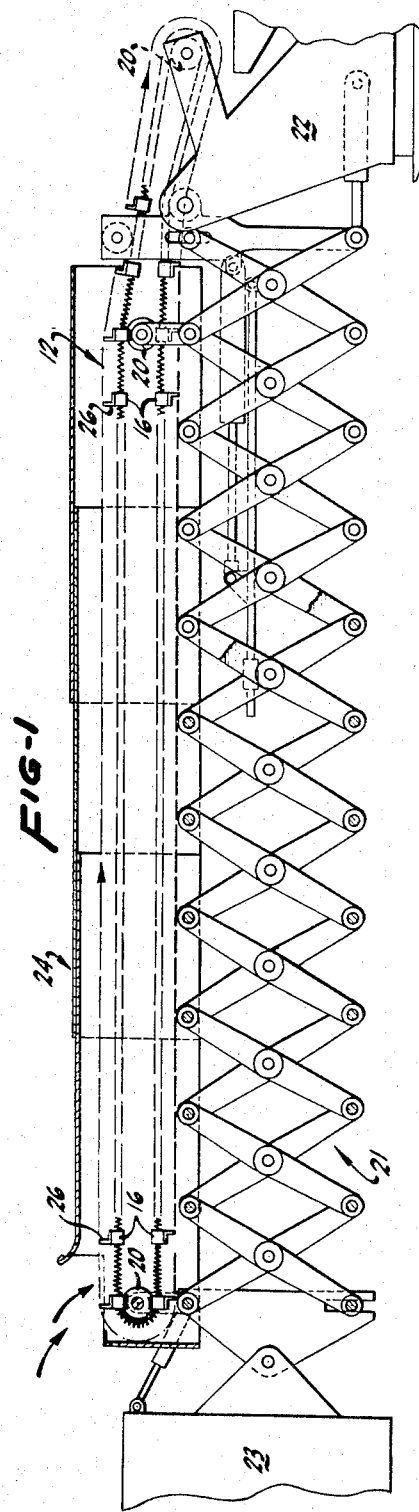
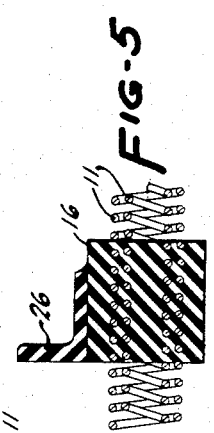
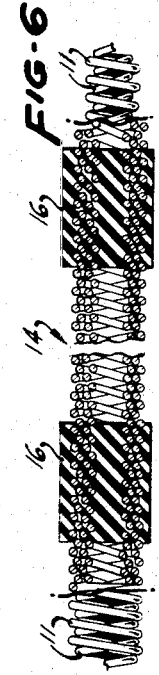
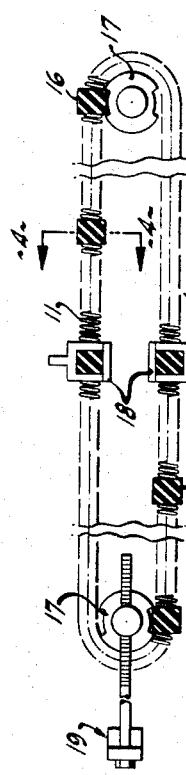
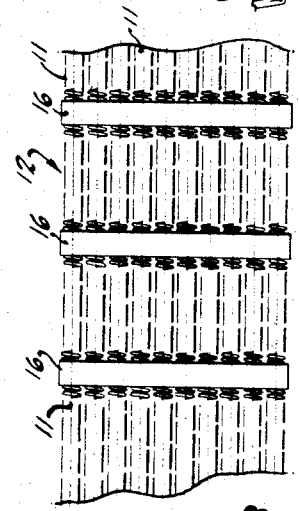
INVENTOR.
ANTONIO L. GIRARDI
BY
ATTORNEY United States Patent Office 3,415,924
Patented Dec. 10, 1968

3,415,924
METHOD OF MANUFACTURING EXTENSIBLE CONVEYOR BELTS
Antonio Lawrence Girardi, 758 W. Acacia St., Salinas, Calif. 93901
Original application Aug. 24, 1960, Ser. No. 51,718. Divided and this application Dec. 21, 1966, Ser. No. 603,630
3 Claims. (Cl. 264—229)

ABSTRACT OF THE DISCLOSURE

This application relates to the manufacture of extensible conveyor belts comprising a plurality of endless coil spring loops bonded together in proximate side-by-side relationship wherein the loops are formed by intermeshing end portions of appropriate lengths of coil spring, passing the springs through molding mechanism and actuating the molding mechanism to mold cross members of rubber like material at intervals along the length of the springs for bonding the springs in said relationship as a unitary assembly, the intermeshed ends of each spring loop being embedded in a molded cross member.

Background of the invention and related applications

This application is a division of my application Ser. No. 51,718, filed Aug. 24, 1960, now abandoned, of which application Ser. No. 355,532, filed Mar. 24, 1964, now Patent No. 3,294,216, was a refiling, confined to the structure of the conveyor, pursuant to the Patent Office requirement for division. The present application is directed to applicant's new and novel method of manufacturing extensible spring conveyors as disclosed in the parent application, Ser. No. 51,718.

Field of invention and objects thereof

The conveyor of the present invention is useful for numerous purposes in many fields of utility and is particularly useful in connection with the extensible booms of orchard apparatus of the character disclosed in my prior Patents No. 2,798,623 and No. 2,927,705.

It is among the objects of the present invention to provide a conveyor which is extensible to accommodate itself to a wide range of extension and retraction of its course without need for auxiliary take-up mechanism.

It is also an object of my invention to provide an extensible conveyor belt which may be extended and retracted through a wide variation of length and along various courses without materially affecting its width.

Another object is to provide an extensible conveyor formed of a plurality of coil springs longitudinally extensible through a wide range, and in which the coils are effectively held in substantially uniformly laterally spaced relation regardless of the longitudinal extension of the conveyor.

It is also a primary object of this invention to provide a method of manufacture by which conveyors of the character described may be manufactured efficiently and economically and which will insure ruggedness and durability in service.

Further objects of the invention include the provision of new and improved features of construction and arrangement which afford advantages in manufacture, installation, and use.

I accomplish these and other objects, some of which with the foregoing will be more fully explained in the following specification, by means of the device shown in the drawings forming a part of this specification and the method of manufacturing the same described herein. The invention of course is not limited to the specific embodiments illustrated and described, as the invention may be otherwise embodied and practiced within the scope of the appended claims.

Brief description of the drawings

FIG. 1 is a fragmental side elevational view showing an extensible conveyor embodying the present invention as applied to an extensible boom such as employed in mobile orchard apparatus, portions of the apparatus being broken away and portions being shown in section.

FIG. 2 is a fragmental side elevational view, partly in vertical section, illustrating in diagrammatic form the structure and method of the present invention.

FIG. 3 is a fragmental plan view of a portion of the conveyor of the present invention.

FIG. 4 is a broken transverse sectional view of the conveyor, the section being taken through a bonding member upon the plane indicated by the line 4—4 of FIG. 2.

FIG. 5 is a sectional detail view illustrating the manner in which doubled intermeshing portions of coil spring are embedded in a molded cross member.

FIG. 6 is a fragmental detail view, partly in vertical section illustrating the intermeshing ends of a doubled length of coil spring and the molded cross members by which the ends are secured in loop forming interlocking engagement.

Broad description of invention

In terms of broad inclusion the present invention relates to an extensible conveyor belt comprising a plurality of coil springs each having its end portions joined to form an endless loop, a plurality of such loops being assembled in parallel relation by means of a plurality of cross members attached to the several springs at intervals along the length thereof to securely hold the loops in relatively close lateral proximate relation without materially limiting longitudinal extension and retraction of the springs to lengthen and shorten the loops as desired. The end portions of each spring are intermeshed to join the ends together to form a loop and cross members engaging the meshed end portions prevent separation of the ends when the loops are extended. The invention also contemplates the method of manufacture which comprises positioning one or more molds over the parallel spring loops while in moderately extended position and molding rubber or equivalent material onto the springs to embed the springs and hold the same in assembled relation by a moderately elastic and resilient bond. The mold (or molds) and the several springs are moved relative to each other longitudinally of the springs to form cross members at substantially regular intervals along the length of the spring loops by manual or mechanical means in any convenient manner.

Description of preferred embodiments

In terms of greater detail, the extensible conveyor of the present invention, as illustrated in the accompanying drawings, comprises a plurality of coil springs 11 positioned in laterally proximate and longitudinally parallel relation, as indicated in FIG. 3 of the drawings. Each spring 11 comprises a length of coil spring of appropriate length having one end pressed into intermeshing relation with the opposite end of the length to form an endless loop 12. The length and weight of the coil spring may of course be varied widely to suit various conditions. If desired a single length of coil spring may be doubled upon itself with the turns of one-half the spring intermeshing with turns of the other half to provide a double spring affording increased strength without materially limiting the extensibility of the spring 15 as shown in FIG. 5. The end portions of such doubled spring will intermesh to provide what may be termed a four-ply joint along the portion where the ends are joined to form an endless loop, as best indicated at 14 in FIG. 6 of the drawings.

The several coil spring loops are connected in side-by-side longitudinally parallel relation by means of cross members 16 connected to the springs at intervals along the length thereof. Preferably the cross members 16 are formed of rubber or equivalent material, molded onto the springs at substantially regular intervals along the lengths of the springs. At least one cross member 16 is applied to engage the interlocking ends of each coil spring loop.

In manufacture, a plurality of loops 12, formed as above explained, are placed upon supporting hubs 17 with the loops in slightly spaced parallel relation. A suitable mold 18 is positioned over one or both reaches of the conveyor loops, as indicated somewhat diagrammatically in FIG. 2. Moldable material, such as rubber, is injected into the mold to form the cross members 16 in which the springs 11 are embedded. Preferably, the spring loops are extended to a moderate degree before the cross members 16 are molded thereonto, so as to minimize stress upon the embedding material when the springs are fully extended in service. For this purpose, the springs may be stretched by any suitable extending mechanism 19, as diagrammatically indicated in FIG. 2.

Instead of molding the cross members 16 onto the springs after they have had their end portions intermeshed to form loops, separate springs may be fed from reels and passed in appropriate proximate relation through molding mechanism to form cross members at desired intervals along continuous lengths of the spring material to form a continuous length of conveyor forming material. Desired lengths of the conveyor material with the lengths of spring bonded together by the cross members longitudinally spaced therealong may then be severed from the supply length; and the ends of the springs and opposite ends of the severed sections then intermeshed and embedded in a cross member molded thereonto to form a loop of desired length.

In service, the conveyor may be mounted for operation over pulleys 20 which are arranged to be moved to variously spaced positions for lengthening and shortening the conveyor as desired. As the pulleys 20 are moved apart, the coil spring loops 12 are stretched, and as the pulleys are moved toward each other the loops contract to accommodate the change in spacing.

While the conveyor is adapted for general purposes, it is particularly adapted for use upon an extensible boom 21 such as utilized in orchard apparatus of the character illustrated in my prior patents above referred to. In FIG. 1 of the drawings, the conveyor is shown mounted to extend from a point over the mounting base 22 upon which such a boom 21 is supported to a platform and cage 23 mounted at the outer end of the boom. As illustrated, the boom is in an extended position, and the conveyor is mounted above the boom and is substantially enclosed from above by a telescoping housing 24.

In this connection, the spring loops 12 extend and contract with the boom in any position of vertical or horizontal adjustment. The springs are sufficiently extensible to reach to the outermost end of the boom when the boom is extended to its outermost limit. When so extended, the several spring loops are retained with their longitudinal axes in predetermined spaced relation, and with no material variation in the spacing between the coils throughout the range of extension. The cross members 16 are positioned at intervals such as to prevent displacement of the springs laterally by the weight of fruit carried thereon so as to prevent fruit from being crowded between the springs. Baffles 26 are provided upon the cross members 16 to advance the fruit with the conveyor. Thus, when the boom is elevated, the baffles will prevent fruit from rolling down the conveyor. When the boom is level or only slightly inclined, the baffles serve to advance the fruit with the conveyor. The baffles 26 may be molded with the cross member 16, or they may be bolted, cemented, or otherwise secured thereto after the molding operation. The spacing of the cross members 16 and the height of the baffles 26 may of course be varied to conform to the needs of any particular service which may be desired.

I claim:

1. The method of manufacturing an endless conveyor belt which comprises positioning a plurality of coil springs in laterally proximate and longitudinally parallel relation, passing said coil springs so positioned through molding means, actuating the molding means to mold cross members on to the springs at predetermined intervals along the lengths thereof, intermeshing the end portions of the lengths of coil spring to form endless loops constituting a continuous assembly of endless coil springs held in said laterally proximate and longitudinally parallel relation by said cross members, and embedding intermeshed end portions of the springs in a cross member.

2. The method of manufacturing an extensible conveyor belt as defined by claim 1 wherein the cross bars are formed of molding material of the character of rubber, and whereon the springs are embedded in and bonded together by said cross members in proximate transverse relation across the width of the assembly.

3. The method of manufacturing an extensible conveyor belt as defined by claim 1 wherein the coil springs are passed through the molding means in a partially extended condition, and wherein the molding means is actuated to mold the cross members onto the springs and thereby bond the endless spring loops in proximate side by side relation with portions of the springs embedded in the cross members in partially extended condition.

References Cited

UNITED STATES PATENTS 2,876,499  3/1959  Schultz _____ 264—277

ROBERT F. WHITE, *Primary Examiner.*

J. H. SILBAUGH, *Assistant Examiner.*

U.S. Cl. X.R.

264—273, 277, 251